(12) United States Patent
Nongpiur

(10) Patent No.: US 10,515,654 B2
(45) Date of Patent: *Dec. 24, 2019

(54) LEARNING ALGORITHM TO DETECT HUMAN PRESENCE IN INDOOR ENVIRONMENTS FROM ACOUSTIC SIGNALS

(71) Applicant: Rajeev Conrad Nongpiur, Palo Alto, CA (US)

(72) Inventor: Rajeev Conrad Nongpiur, Palo Alto, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 16/459,094

(22) Filed: Jul. 1, 2019

(65) Prior Publication Data

US 2019/0325893 A1     Oct. 24, 2019

Related U.S. Application Data

(63) Continuation of application No. 16/051,269, filed on Jul. 31, 2018, now Pat. No. 10,388,303, which is a continuation of application No. 14/745,461, filed on Jun. 21, 2015, now Pat. No. 10,068,587.

(60) Provisional application No. 62/018,665, filed on Jun. 30, 2014.

(51) Int. Cl.
| | | |
|---|---|---|
| *G10L 25/51* | (2013.01) | |
| *G10L 17/26* | (2013.01) | |
| *G10L 17/02* | (2013.01) | |
| G10L 25/15 | (2013.01) | |
| G10L 25/90 | (2013.01) | |

(52) U.S. Cl.
CPC ............. *G10L 25/51* (2013.01); *G10L 17/02* (2013.01); *G10L 17/26* (2013.01); G10L 25/15 (2013.01); G10L 25/90 (2013.01)

(58) Field of Classification Search
CPC ......... G10L 25/51; G10L 17/02; G10L 17/26; G10L 25/15; G10L 25/90; G10L 19/00; G10L 19/14
USPC ......................................................... 704/231
See application file for complete search history.

(56) References Cited

U.S. PATENT DOCUMENTS

| | | | | |
|---|---|---|---|---|
| 7,710,824 B1* | 5/2010 | Katzer | ................... | G01S 15/04 367/99 |
| 2005/0021815 A1* | 1/2005 | Haneda | ................. | G10L 19/167 709/231 |
| 2005/0225442 A1* | 10/2005 | Kanayama | ........... | G08B 25/008 340/539.13 |

(Continued)

OTHER PUBLICATIONS

U.S. Appl. No. 14/745,461, filed Jun. 21, 2015.
U.S. Appl. No. 16/051,269, filed Jul. 31, 2018.

*Primary Examiner* — Akwasi M Sarpong
(74) *Attorney, Agent, or Firm* — Davis Wright Tremain LLP

(57) ABSTRACT

A system is described that constantly learns the sound characteristics of an indoor environment to detect the presence or absence of humans within that environment. A detection model is constructed and a decision feedback approach is used to constantly learn and update the statistics of the detection features and sound events that are unique to the environment in question. The learning process may not only rely on acoustic signal, but may also make use of signals derived from other sensors such as range sensor, motion sensors, pressure sensors, and video sensors.

20 Claims, 9 Drawing Sheets

(56) References Cited

U.S. PATENT DOCUMENTS

| | | | | |
|---|---|---|---|---|
| 2006/0089959 | A1* | 4/2006 | Nongpiur | G10L 21/0364 708/300 |
| 2007/0118364 | A1* | 5/2007 | Wise | G10L 25/78 704/215 |
| 2009/0242769 | A1* | 10/2009 | Luterotti | G01J 5/0022 250/339.02 |
| 2010/0179874 | A1* | 7/2010 | Higgins | G06K 9/00664 705/14.53 |
| 2011/0137649 | A1* | 6/2011 | Rasmussen | H04R 25/356 704/231 |
| 2012/0116763 | A1* | 5/2012 | Koshinaka | G10L 17/04 704/250 |
| 2013/0148845 | A1* | 6/2013 | Maeda | G01S 17/023 382/103 |
| 2014/0249676 | A1* | 9/2014 | Florencio | B25J 9/1694 700/259 |
| 2014/0366111 | A1* | 12/2014 | Sheller | H04L 63/08 726/7 |
| 2016/0197967 | A1* | 7/2016 | Kreifeldt | G06K 9/00255 |

* cited by examiner

LEARNING ALGORITHM TO DETECT HUMAN PRESENCE IN INDOOR ENVIRONMENTS FROM ACOUSTIC SIGNALS

RELATED APPLICATIONS

This application is a continuation of U.S. patent application Ser. No. 16/051,269, filed Jul. 31, 2018, which is a continuation of U.S. patent application Ser. No. 14/745,461, filed Jun. 21, 2015, which claims priority to U.S. Provisional Patent Application No. 62/018,665, filed Jun. 30, 2014, entitled LEARNING ALGORITHM TO DETECT HUMAN PRESENCE IN INDOOR ENVIRONMENTS FROM ACOUSTIC SIGNALS, the contents of which are incorporated by reference herein in their entirety for all purposes.

BACKGROUND

This invention generally relates to the detection of human presence in an indoor environment. More particularly, embodiments of this invention relate to the detection of human presence or absence in an indoor environment using acoustic signals.

Detection of the presence or absence of humans in an indoor environment using acoustic signals is a challenge. Each indoor environment has different sound distributions, different acoustic response, and different acoustic sources. Furthermore, each human occupying the indoor environment has different acoustic traits and occupancy habits. Therefore, developing a detection algorithm that works for all types of indoor environments and humans traits becomes very complex and difficult.

Rather than focusing on a system that works for most scenarios, a more tractable and cost effective approach would be to design a system that works for certain types of indoor environments and human traits. However, such a system has the disadvantage of being too specific and therefore inflexible. There is room for improvement for human presence detection especially in indoor environments. There is a need for a detection system that is sensitive, accurate, has low computational effort, and sufficiently flexible for different indoor environments and human traits.

It will be appreciated that these systems and methods are novel, as are applications thereof and many of the components, systems, methods and algorithms employed and included therein. It should be appreciated that embodiments of the presently described inventive body of work can be implemented in numerous ways, including as processes, apparata, systems, devices, methods, computer readable media, computational algorithms, embedded or distributed software and/or as a combination thereof. Several illustrative embodiments are described below.

SUMMARY

A system that detects human presence in an indoor environment using acoustic signals. The system learns the sound characteristics that are specific to the environment and updates the models so as to make the detection more accurate. A detection model is constructed and a decision feedback approach is used to constantly learn and update the statistics of the detection features and sound events that are unique to the environment in question. The learning process may not only rely on acoustic signal, but may also make use of signals derived from other sensors such as range sensor, motion sensors, pressure sensors, and video sensors.

A system that estimates the pitch and vocal-tract length from speech and classifies the speakers in an indoor environment on the basis of the two estimates. The system learns the pitch and vocal-tract length of the various speakers and performs unsupervised classifications for a prescribed number of speakers. In cases where there are multiple speakers present at the same time, the estimates of the various speakers are constrained to be mutually exclusive thereby resulting in a form of semi-supervised classification.

BRIEF DESCRIPTION OF THE DRAWINGS

The inventive body of work will be readily understood by referring to the following detailed description in conjunction with the accompanying drawings, in which.

DETAILED DESCRIPTION

A detailed description of the inventive body of work is provided below. While several embodiments are described, it should be understood that the inventive body of work is not limited to any one embodiment, but instead encompasses numerous alternatives, modifications, and equivalents. In addition, while numerous specific details are set forth in the following description in order to provide a thorough understanding of the inventive body of work, some embodiments can be practiced without some or all of these details. Moreover, for the purpose of clarity, certain technical material that is known in the related art has not been described in detail in order to avoid unnecessarily obscuring the inventive body of work.

Figure 1:
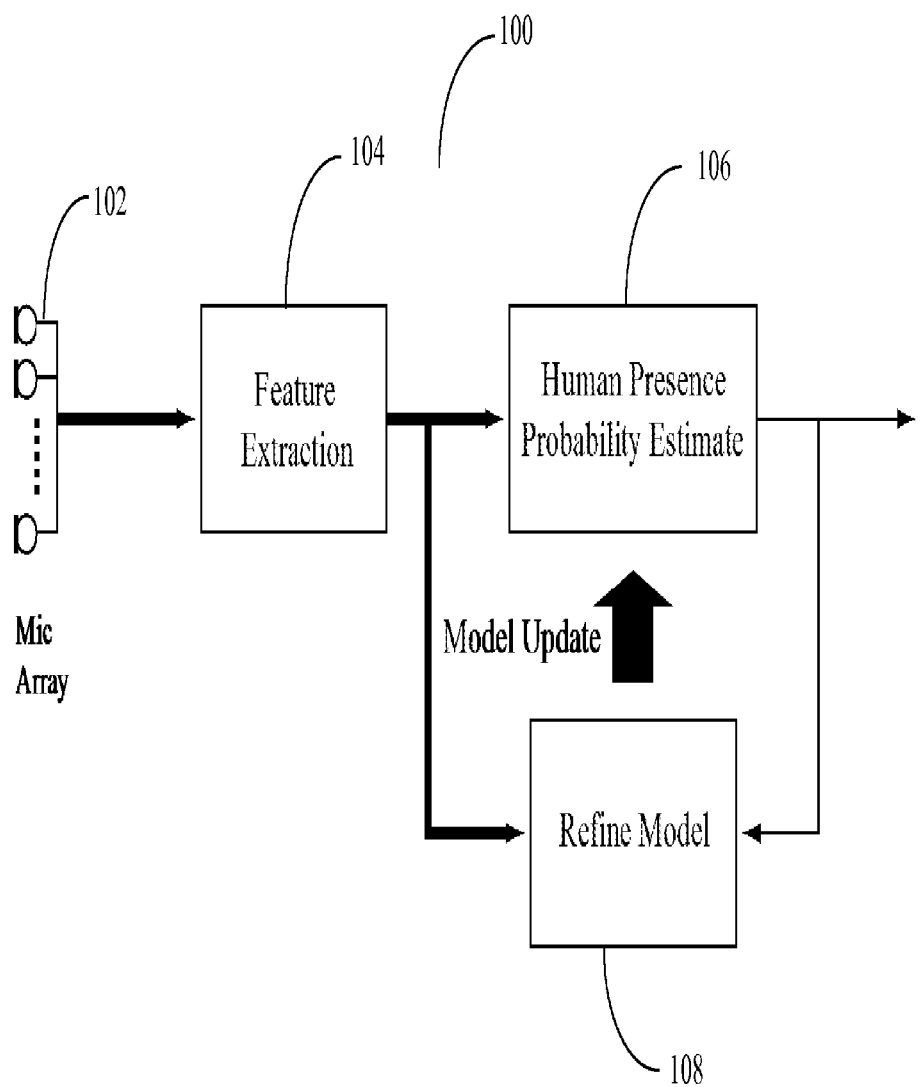
FIG. 1 illustrates a block diagram of a system for detecting human presence in an indoor environment.

FIG. 1 illustrates a block diagram of a system 100 for estimating and improving the speech intelligibility in an enclosure. The system 100 includes a microphone array 102, a feature extraction module 104, a human presence processing module 106, and a model refinement module 108.

The feature extraction module 104 extracts the relevant detection features from a microphone array 102, including other features such as the time of day, day of week, and month of year information.

The human presence processing module 106 uses the extracted features from module 104 to detect certain acoustic events that may indicate the presence or absence of humans within the environment. The probabilistic estimates of the acoustic events are then used to compute the probability of human presence within the indoor environment.

The model refinement module 108 refines and updates the detection model. It takes as input the detection features and the probability estimate of human presence, and uses them to refine the prior probability distribution of the features and to establish more accurate correlation between an acoustic event and human presence/absence.

Figure 2:
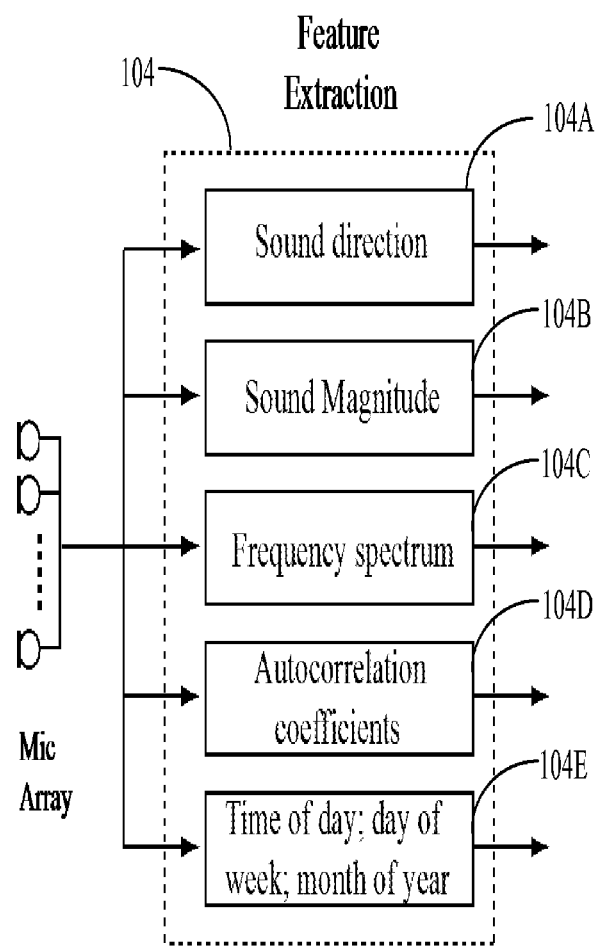
FIG. 2 illustrates a more detailed diagram of the feature extraction module.

FIG. 2 illustrates a more detailed block diagram of the feature extraction module 104. The feature extraction module 104 includes modules to extract the sound direction 104A, the sound magnitude 104B, the frequency spectrum 104C, the autocorrelation coefficients 104D, and the time information 104E.

The sound direction estimator 104A estimates the direction of arrival (DOA) of sound. One simple approach that may be used by the sound estimator 104A is to compute the time-delay between the microphones using cross-correlation.

The sound magnitude estimator 104B computes the magnitude of each block of the acoustic signal. The magnitude can be computed in several ways such as taking the average power of the block, the average value of the spectral envelope of the block, or the maximum value of the spectral envelop of the block. When computing the average or maximum estimates the frequency spectrum can also give more weightage to certain frequency regions that have greater correspondence to human speech.

The frequency spectrum estimator 104C computes the frequency spectrum of the data block and may use several representations such as the fast Fourier transform, wavelet transform, cepstrum, or mel-frequency cepstrum. The autocorrelation coefficients estimator 104D computes the coefficients directly from the time-domain signal or may do so indirectly from the power spectral density of the signal. The time information computer 104E can use an in-built timer to obtain the time-of-day, day-of-week, and month-of-year information.

The feature extraction module 104 may also include a geographical information locator. The geographical location of the indoor environment can provide useful information about the weather, vehicular traffic, population density, which can indirectly affect the external acoustic environment. for e.g., if we know that a certain location has warm weather, the likelihood of an open window will be higher, and this, in turn, increases the likelihood that the external acoustic environment will have greater impact on the indoor acoustic environment.

Figure 3:
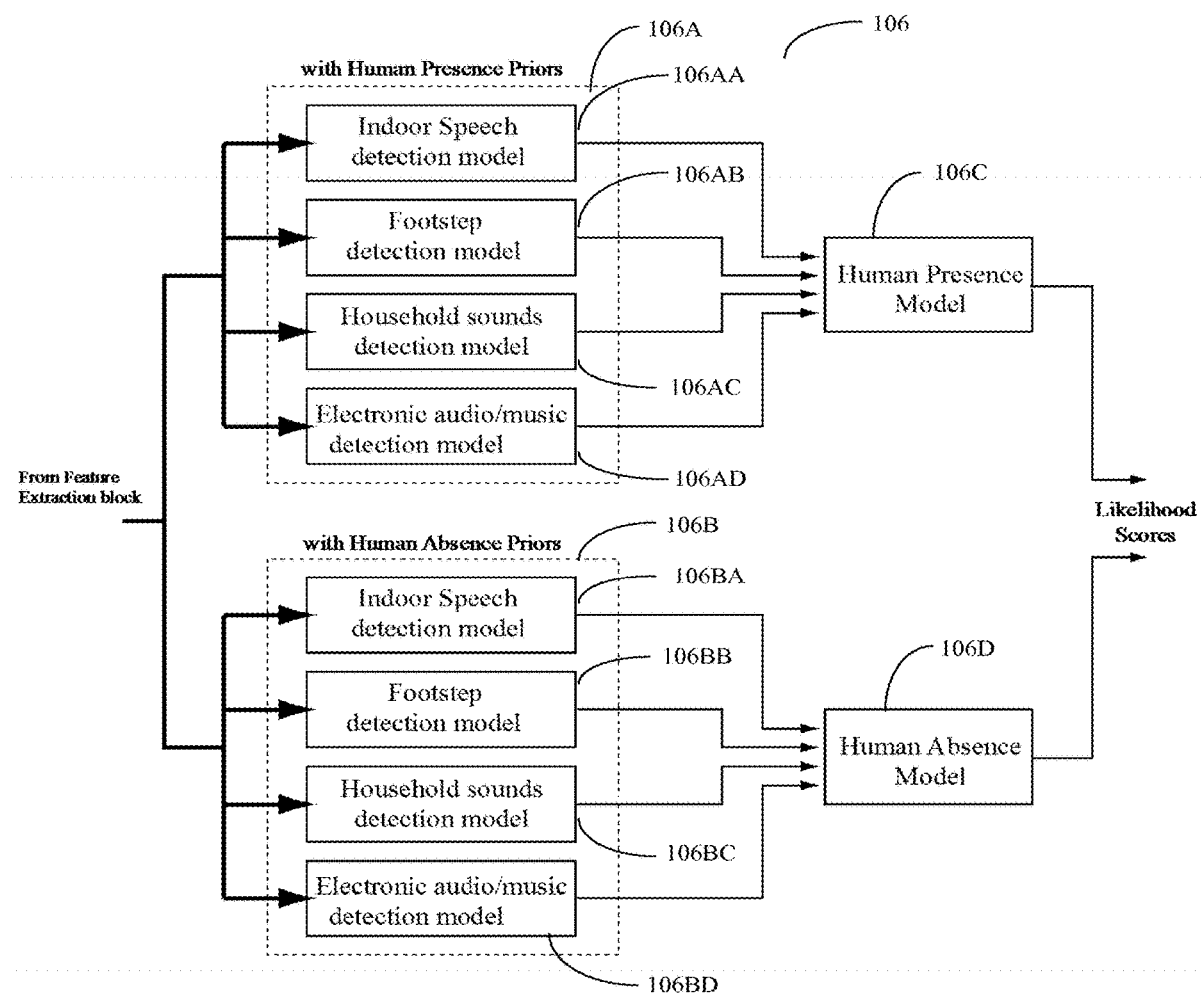
FIG. 3 illustrates a more detailed diagram of the human presence and human absence detection models.

FIG. 3 illustrates a more detailed block diagram of module 106 for estimating the likelihood scores for human presence and human absence in an indoor environment. The module 106 has two stages for computing the likelihood for human presence 106A and 106C, and two stages for computing the likelihood for human absence 106B and 106D. In the first stage of human presence/absence detection modules 106A and 106B, the detection probabilities of various acoustic events are computed based on the features obtained from the microphone array and their updated prior probability distributions. Then, in the second stage, 106C and 106D, the probability estimates of the various events are combined together to compute the probabilistic scores for human presence and human absence in the considered indoor environment.

The first stage of the model for estimating the likelihood score for human presence 106A, include the indoor speech detection model 106AA, the footstep detection model 106AB, the household sounds detection model 106AC, and the electronic audio/music detection model 106AD. Similarly, the first stage of the model for estimating the likelihood score for human absence 106B, include the indoor speech detection model 106BA, the footstep detection model 106BB, the household sounds detection model 106BC, and the electronic audio/music detection model 106BD.

The indoor speech detection models 106AA and 106BA compute the probability that the signal satisfies the following: (1) is human speech, (2) is generated within the indoor environment, and (3) is generated from a human speaker (not electronic device). The model can be realized using either generative models such as hidden Markov models (HMMs), discriminative models such as the support vector machines/logistic regression, or hybrids such as deep neural networks. The features that are important for point (2) above include the magnitude of the speech signal, the DOA of the speech signal, and their prior probability distribution; for example, if it is known beforehand that the speech signal from a certain direction has a higher probability of being generated from an electronic device, the model takes the distribution into account. For point (3), the important parameters include variation in DOA, absence of non-speech acoustics (like music, impulse noise etc.), and prior probability distribution of the DOA, magnitude, and occurrence time with respect to the speech detection event.

The footstep detection models 106AB and 106BB compute the probability that the received acoustic corresponds to human footsteps. The model can be constructed using temporal models such HMMs and trained to detect a large variation of human footsteps, both in high- and low-noise environments.

The household sounds detection models 106AC and 106BC detects other household human-made sounds such as keyboard typing, toilet flush, exhaust fan, and sounds in the kitchen area (e.g., chopping of food, heating in a microwave, opening of water tap, and clanging of utensils/cups/plates/spoons). Learned knowledge of the prior probability distribution of the DOA, signal magnitude, and time of occurrence of the corresponding sounds can be used to enhance the accuracy of the model.

The electronic audio/music detection models 106AD and 106BD computes the probability that the received acoustic signal corresponds to electronically generated speech or music. In general, audio and music from electronic devices have DOAs that are stationary; furthermore, in cases where there are multiple loudspeakers, similar copies of the signal can be received from different directions. If the electronic device is a TV or a music system, then the presence of non-speech signals such as music can be used as criteria for detection. Additionally, learned knowledge of the prior probability distribution of the DOA of electronic audio and time of occurrence can be used to enhance the accuracy of the model.

The prior probability distributions of input features for the acoustic-event models 106A and 106B are gradually updated and become more customized to the indoor environment over time. Note that the prior probability distributions of the input features corresponding to human presence and absence are usually different from one another.

The second stage of module 106 for estimating the likelihood scores 106C and 106D uses the probability estimates of the sound-event detection models in the first stage to arrive at the probability estimate for human presence. To compute the probability, a joint probability distribution of the occurrence of sounds events and human presence, which is learned over time, is used. If A, B, C, and D correspond to each of the sound events in stage one and $H_P$ corresponds to human presence and absence, respectively, then the joint probability is given by $P(H_P, A, B, C, D)$. The probabilities of $H_P$ can be computed from the joint probability by marginalizing out the sound events; i.e., $$P(H_P) = \sum_a \sum_b \sum_c \sum_d P(H_P, A, B, C, D)$$

Figure 4:
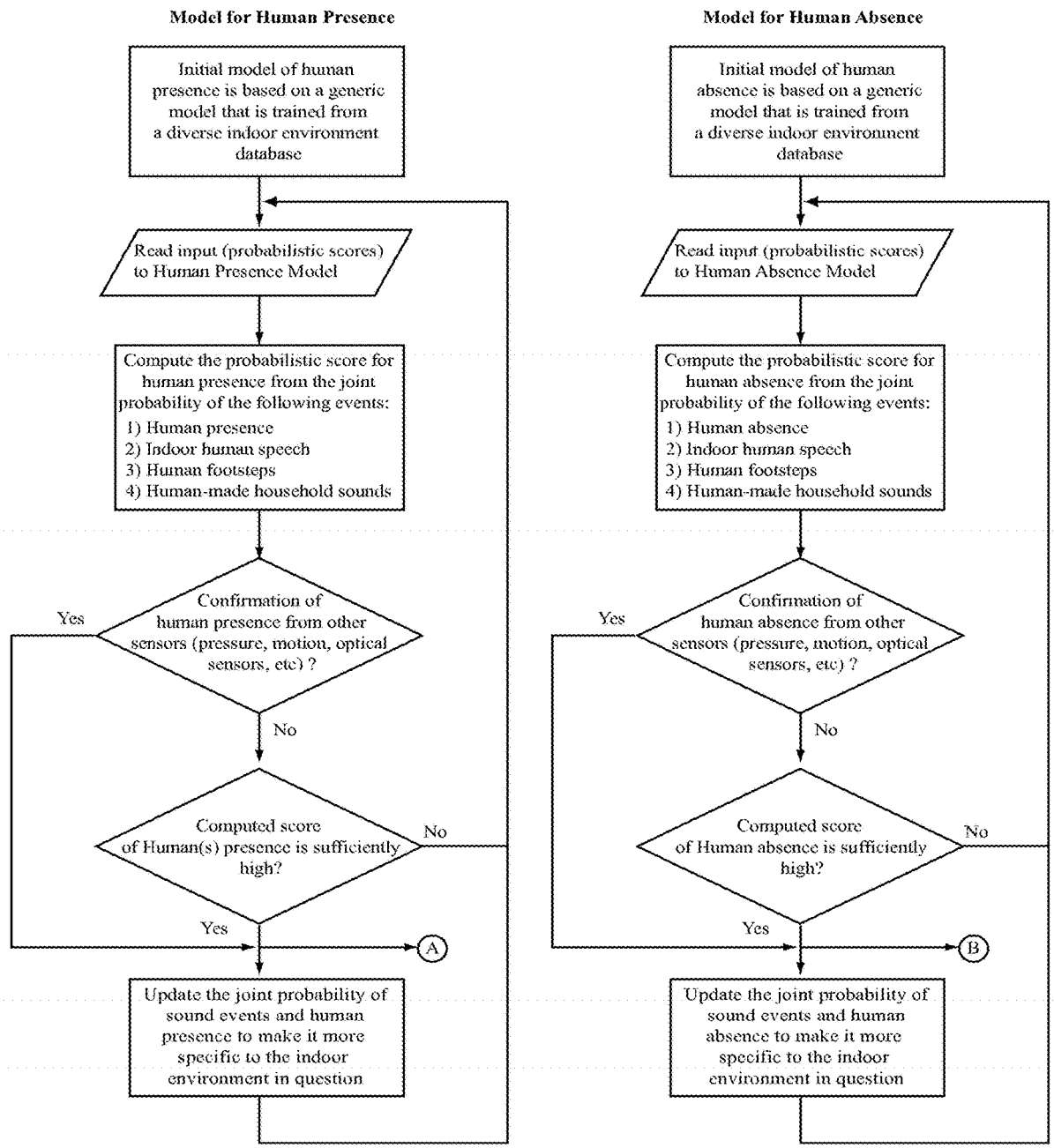
FIG. 4 illustrates a flowchart to refine the joint probability of (a) sound events and human presence (b) sound events and human absence.

FIG. 4 illustrates a flowchart for refining the human presence model 106C and human absence model 106D. As can be seen, the initializing model is a generic model that is trained from a database of different indoor environments and sound-event scenarios. Over time, the event statistics of the two models are gradually updated so that they become more specific to the considered indoor environment. From the flowchart, we observe that there are two ways to select the events in order to update the event statistics: In the first case, the model is explicitly notified of human presence (or absence), while in the second case only those events that result in a high probabilistic score of human presence (or absence) are selected for updating.

Figure 5:
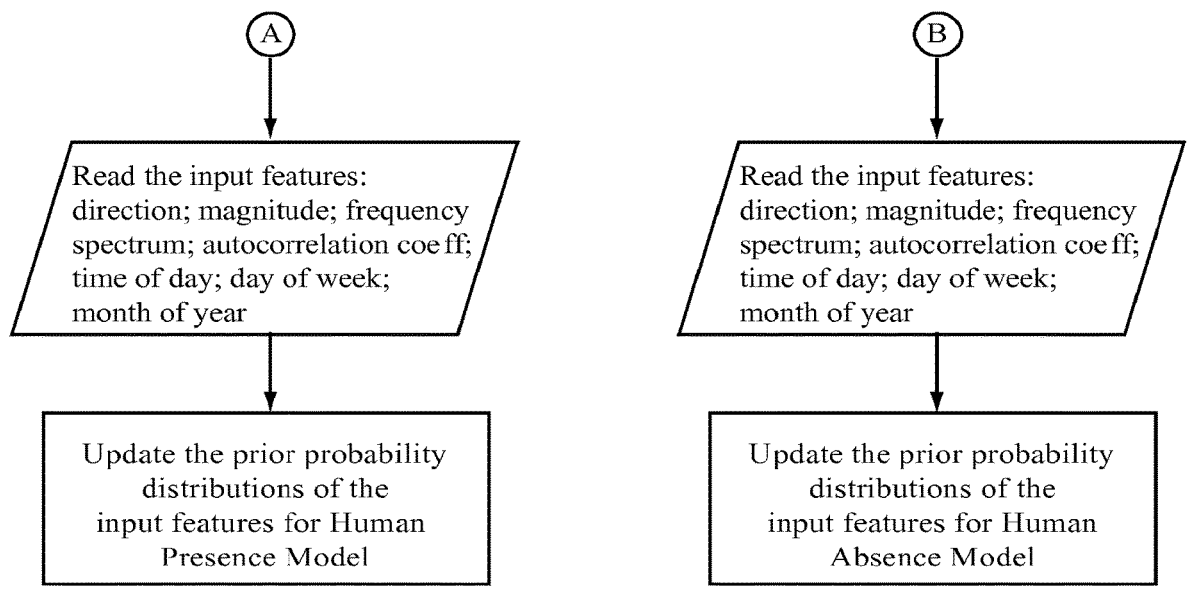
FIG. 5 illustrates a flowchart to refine the prior probability of the input features for the human presence and human absence models.

FIG. 5 illustrates the flowchart where the prior probability distribution of the acoustic event models corresponding to human presence and human absence are updated to gradually reflect the characteristics of the considered indoor environment. As the priors become more specific to the indoor environment, the acoustic event models become more accurate.

Although the foregoing has been described in some detail for purposes of clarity, it will be apparent that certain changes and modifications may be made without departing from the principles thereof. It should be noted that there are many alternative ways of implementing both the processes and apparatuses described herein. Accordingly, the present embodiments are to be considered as illustrative and not restrictive, and the inventive body of work is not to be limited to the details given herein, which may be modified within the scope and equivalents of the appended claims.

Figure 6:
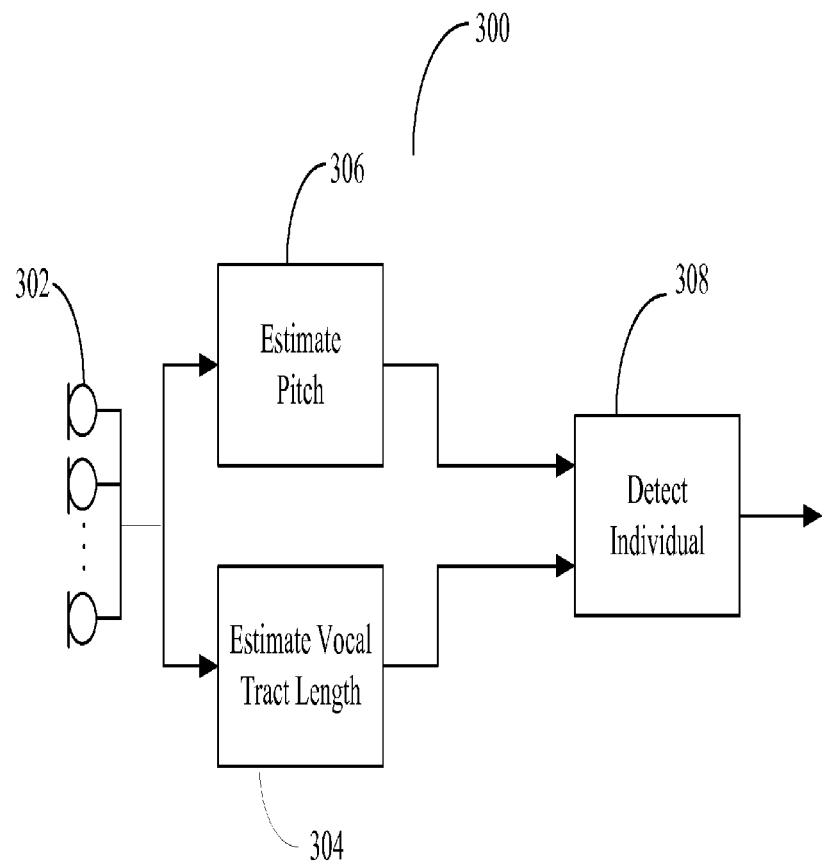
FIG. 6 illustrates a block diagram for detecting an individual in an indoor environment

FIG. 6 illustrates a block diagram of a system 300 for identifying an individual in an indoor environment. The system 300 includes a microphone array 302, a vocal tract length estimation module 304, a pitch estimation module 306, and a model 308 to identify an individual.

On the basis of the pitch estimate and the vocal-tract-length estimate, the likelihood of being generated from each of the individuals' model is computed. The individual whose corresponding model gives the maximum likelihood estimates is then selected.

Figure 7:
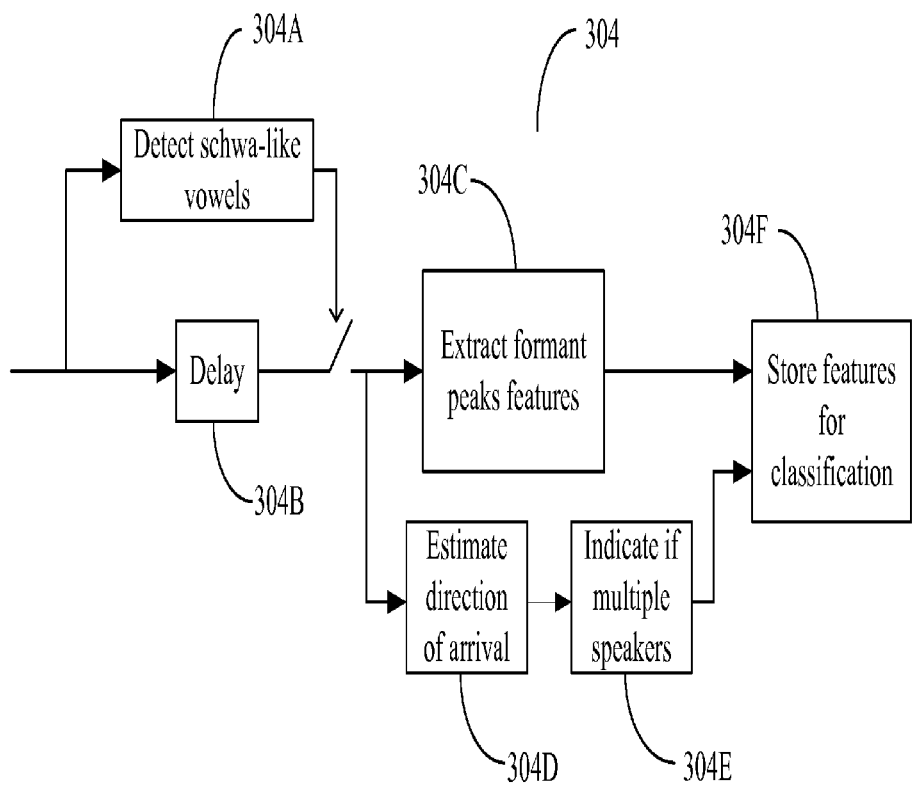
FIG. 7 illustrates a block diagram for estimating the vocal tract length from speech

FIG. 7 illustrates a more detailed block diagram of a system 304 for extracting the formant peaks features, since they directly correlate with the vocal tract length. The system 304 includes a schwa-like vowel detector 304A, a formant-peak estimation module 304C, a DOA estimation module 304D, a multiple-speaker indicator module 304E, and a storage module 304F for classification.

The estimated formant peaks are stored in the storage module 304F. If there are multiple speakers present during the same time, the estimated formant peaks from the various speakers are appropriated labeled so that they are always mutually exclusive from each other during classification.

Figure 8:
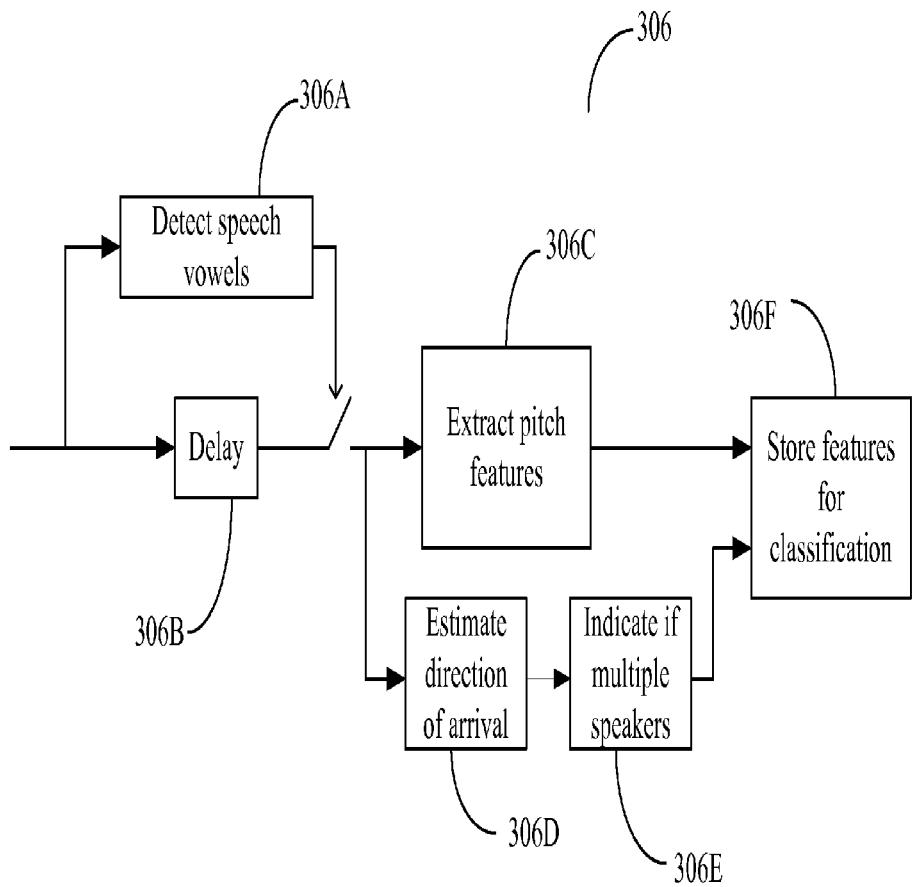
FIG. 8 illustrates a block diagram for estimating the pitch from speech.

FIG. 8 illustrates a more detailed block diagram of a system 306 for extracting the pitch of the speech signal. The system 306 includes a speech vowel detector 306A, a pitch estimation module 304C, a DOA estimation module 304D, a multiple-speaker indicator module 304E, and a storage module 304F for classification.

The estimated pitch is stored in the storage module 306F. If there are multiple speakers present at the same time, the estimated pitch values from the various speakers are appropriated labeled so that they are always mutually exclusive from each other during classification.

Figure 9:
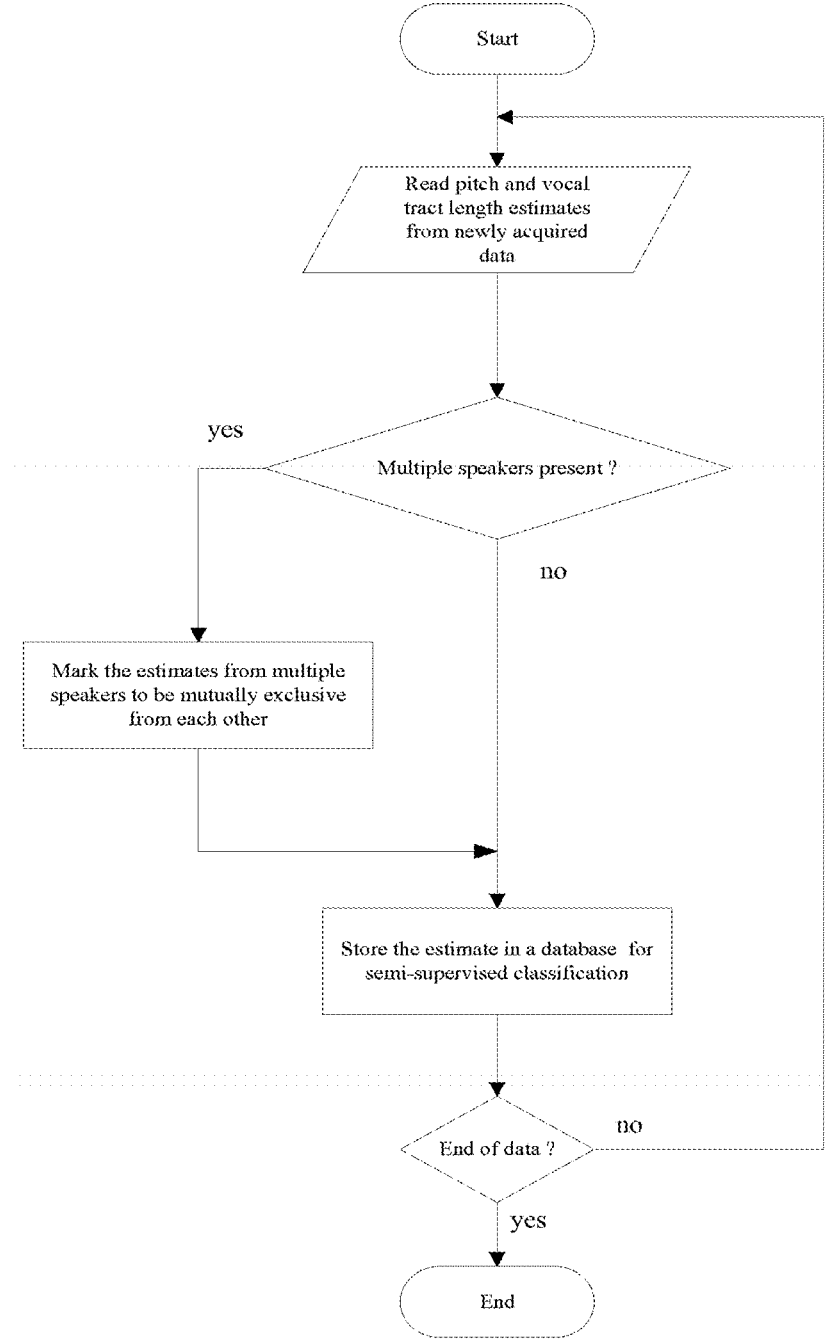
FIG. 9 illustrates a flowchart for preparing the data for semi-supervised classification.

FIG. 9 illustrates a flowchart for labeling the estimates from multiple speakers that are simultaneously present so that they are mutually exclusive during classification. For classification, clustering algorithms such as K-means algorithm, mixture models, and hidden Markov models can be used.

What is claimed is:

1. A method for detecting presence of one or more individual human in an indoor environment comprising:
    refining at least one of models of a plurality of models based at least in part on a determination that a first individual human is present in the indoor environment, so that the models over time become more accurate and more specific to respective characteristics of acoustic features of each of a set of individual human occupants and to the particular indoor environment, wherein refining the models includes:
    starting with generic models to detect, from acoustic features, the presence and absence of each of one or more individual human occupants in the indoor environment; and
    during high-detection probability of presence of a particular individual human occupant, modifying a human-presence model for that particular individual human occupant so that relevant acoustic features specific to the particular individual human occupant and the indoor environment are emphasized, thereby improving accuracy of the human-presence model for that particular individual human occupant over time.

2. The method of claim 1, wherein the determination that the first individual human is present in the indoor environment comprises:
    comparing acoustic events with each of the plurality of models; and
    computing a likelihood score for each of the plurality of models based at least on the comparing the acoustic events with each of the plurality of models.

3. The method of claim 2, wherein the determination that the first individual human is present in the indoor environment further comprises:
    identifying a first model of the plurality of models having a greatest likelihood score, the first model associated with the first individual human; and
    determining that the first individual human is present in the indoor environment based at least in part on the first model associated with the first individual human being identified as having a greatest likelihood score.

4. The method of claim 1, further comprising detecting acoustic events in an audio signal associated with the first individual human present in the indoor environment, the detecting comprising:
    extracting directions of the audio signals;
    extracting magnitude of the audio signals;
    extracting frequency spectrogram of the audio signals;
    extracting autocorrelation coefficients of the audio signals; and
    extracting time information of the audio signals.

5. The method of claim 1, wherein refining at least one of the models of the plurality of models based at least in part on the determination that the first individual human is present in the indoor environment includes:
   initializing a generic model for human-presence or human-absence;
   computing a probabilistic score for presence or absence of each individual human occupant from a joint probability of acoustic events; and
   updating a prior probability distribution of input features for a human-presence model or a human-absence model for each individual human occupant.

6. The method for claim 5, wherein the updating the prior probability distribution of the input features for the human-presence model or the human-absence model of each individual human occupant includes:
   confirmation of human presence or absence from one or more sensors that is different than a sensor that generated an audio signal from the indoor environment; and
   compute a score of presence or absence of each occupant from the human-presence model or human-absence model.

7. The method of claim 6 further comprising:
   when presence or absence of an individual human occupant is confirmed or the score of presence and absence for an occupant exceeds a prescribed threshold:
      updating joint probability of acoustic events and human presence or absence for the individual human occupant; and
      updating a prior distribution of input features for the human-presence model or human absence model for the individual human occupant.

8. The method of claim 1, further comprising computing a likelihood score for presence or absence of each occupant in the indoor environment comprising:
   computing, using the respective models, detection probabilities of detected acoustic events during presence or absence of a respective individual human occupant; and
   computing from a human-presence model or a human-absence model the likelihood score for the presence or absence of the respective individual human occupant, from the detection probabilities of the detected acoustic events.

9. The method of claim 8, wherein computing the detection probabilities of the detected acoustic events during presence or absence of each individual human occupant includes:
   computing the acoustic features corresponding to the acoustic events from microphone array signals obtained from a microphone array in the indoor environment; and
   computing a probability of acoustic features during presence and absence of each occupant by taking into account prior probability distributions of acoustic features during determined presence and absence of each respective individual human occupant in the indoor environment.

10. A computer implemented method comprising:
   refining at least one model of a plurality of models based at least in part on a determination that a first individual is present in an indoor environment, the refining such that the models become more accurate in determining presence of specific individuals being present in the indoor environment, the refining of the model of the plurality of models including:
      during high-detection probability of presence of a particular individual occupant, modifying an occupant-presence model for that particular individual occupant so that relevant features specific to the particular individual occupant and the indoor environment are emphasized to improve accuracy of the occupant-presence model for that particular individual occupant.

11. The computer implemented method of claim 10, wherein each model of the plurality of models is associated with a respective individual of a plurality of individuals.

12. The computer implemented method of claim 10, wherein the determining that the first individual is present in the indoor environment is based at least in part on a first model associated with the first individual being identified as having a greatest likelihood score for being present in the indoor environment.

13. The computer implemented method of claim 10, wherein refining at least one of the models of the plurality of models based at least in part on the determining that the first individual is present in the indoor environment, refining the at least one model a plurality of successive instances over time to become increasingly more accurate and more specific to characteristics of the features of each of the respective individual occupants and the particular indoor environment.

14. The computer implemented method of claim 10, wherein determining that a first individual is present in the indoor environment is based at least in part on determining a separate probability score for:
   the absence of each of the individual occupants in the indoor environment, and
   the presence of each of the individual occupants in the indoor environment.

15. The computer implemented method of claim 10, wherein the refining of a model of the plurality of models further includes starting with a generic occupant-presence model to detect presence of at least one specific individual in the indoor environment and during high-detection probability of presence of a particular individual occupant, modifying the generic occupant-presence model for the particular individual occupant so that relevant features specific to the particular individual occupant and the indoor environment are emphasized to improve accuracy of the occupant-presence model for that particular individual occupant.

16. The computer implemented method of claim 10, further comprising obtaining one or more signal from the indoor environment, the one or more signal obtained from the indoor environment comprising a signal obtained from at least one of a range sensor, motion sensor, pressure sensor, or video sensor.

17. The computer implemented method of claim 10, wherein refining at least one of the models of the plurality of models comprises determining a pitch and vocal-tract length of a plurality of individuals.

18. The computer implemented method of claim 10, wherein refining at least one of the models of the plurality of models based at least in part on the determining that the first individual is present in the indoor environment includes:
   initializing a generic model for individual occupant presence or absence;
   computing a probabilistic score for presence or absence of each individual occupant from a joint probability of acoustic events; and
   updating a prior probability distribution of input features for a presence model or an absence model for each individual occupant.

19. The computer implemented method of claim 18, wherein the updating the prior probability distribution of the input features for the presence model or the absence model of each individual occupant includes:
- confirmation of individual occupant presence or absence from one or more sensors that is different than a sensor that obtained an audio signal from the indoor environment; and
- computing a score of presence or absence of each occupant from the presence model or absence model.

20. The computer implemented method of claim 19, further comprising:
- when presence or absence of an individual occupant is confirmed or the score of presence and absence for an occupant exceeds a prescribed threshold:
  - updating joint probability of events and presence or absence for the individual occupant; and
  - updating a prior distribution of input features for the presence model or absence model for the individual occupant.

* * * * *